(12) United States Patent
Tuo

(10) Patent No.: US 10,781,536 B2
(45) Date of Patent: Sep. 22, 2020

(54) PREPARATION METHOD OF PARA-ARAMID NANOFIBERS

(71) Applicant: TSINGHUA UNIVERSITY, Beijing (CN)

(72) Inventor: Xinlin Tuo, Beijing (CN)

( * ) Notice: Subject to any disclaimer, the term of this patent is extended or adjusted under 35 U.S.C. 154(b) by 21 days.

(21) Appl. No.: 15/888,024

(22) Filed: Feb. 4, 2018

(65) Prior Publication Data

US 2018/0155853 A1 Jun. 7, 2018

Related U.S. Application Data

(63) Continuation of application No. PCT/CN2016/099489, filed on Sep. 20, 2016.

(30) Foreign Application Priority Data

Sep. 25, 2015 (CN) .......................... 2015 1 0624460

(51) Int. Cl.
| | |
|---|---|
| C08G 69/32 | (2006.01) |
| D01F 6/60 | (2006.01) |
| C08G 69/28 | (2006.01) |
| D01D 1/02 | (2006.01) |
| D01D 5/40 | (2006.01) |
| D01D 5/38 | (2006.01) |
| D01D 10/06 | (2006.01) |
| D01F 1/10 | (2006.01) |
| D01F 11/08 | (2006.01) |
| D01F 13/04 | (2006.01) |

(52) U.S. Cl.
CPC ............ *D01F 6/605* (2013.01); *C08G 69/28* (2013.01); *C08G 69/32* (2013.01); *D01D 1/02* (2013.01); *D01D 5/38* (2013.01); *D01D 5/40* (2013.01); *D01D 10/06* (2013.01); *D01F 1/10* (2013.01); *D01F 11/08* (2013.01); *D01F 13/04* (2013.01)

(58) Field of Classification Search
CPC ...... C08G 69/32; C08J 5/005; C08L 2205/16; C08L 77/10
See application file for complete search history.

(56) References Cited

U.S. PATENT DOCUMENTS

| | | | | |
|---|---|---|---|---|
| 4,579,895 A | * | 4/1986 | Cuidard .................. | C08L 77/10 524/104 |
| 5,021,123 A | * | 6/1991 | Sweeny .................. | D01F 6/605 162/146 |
| 5,726,275 A | * | 3/1998 | Bannenberg-Wiggers .................. | B29B 9/02 528/208 |
| 2010/0234496 A1 | | 9/2010 | Hendriks et al. | |
| 2010/0288692 A1 | * | 11/2010 | Kakzau ................ | D04H 1/4382 210/500.1 |

FOREIGN PATENT DOCUMENTS

| | | |
|---|---|---|
| CN | 1693548 A | 11/2005 |
| CN | 104403119 | * 3/2015 |
| CN | 104403119 A | 3/2015 |
| CN | 105153413 A | 12/2015 |

OTHER PUBLICATIONS

International Search Report of PCT/CN2016/099489, dated Dec. 23, 2016.

* cited by examiner

*Primary Examiner* — Gregory Listvoyb
(74) *Attorney, Agent, or Firm* — Erson IP (Nelson IP)

(57) ABSTRACT

The present invention relates to a preparation method of para-aramid nanofibers, and belongs to the technical field of novel polymer materials. The para-aramid nanofibers prepared in the present invention have a diameter of 10-100 nm, and a length of hundreds of microns. The preparation method includes: adding a certain amount of surfactant in a PPTA low-temperature polymerization process, and controlling aggregation of PPTA molecules along with growth of a PPTA molecule chain, thereby preparing the para-aramid fibers with a uniform size and an adjustable nano-scale diameter under assistance of other means (e.g., a coagulator and high-speed shearing dispersion). The present invention is short in production process and simple in equipment, can realize stable batch production to meet needs of large-scale production of the para-aramid nanofibers, has wide application prospects and can be applied to preparing a lithium-ion battery separator, a high-performance composite material and the like.

2 Claims, 1 Drawing Sheet

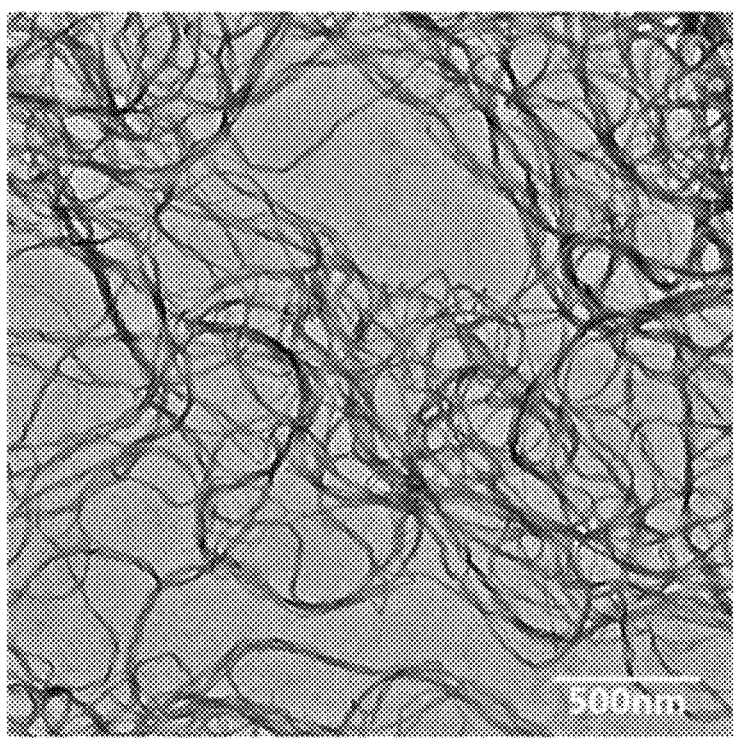

PREPARATION METHOD OF PARA-ARAMID NANOFIBERS

CROSS-REFERENCE TO RELATED APPLICATIONS

This application is a continuation of International Patent Application No. PCT/CN2016/099489 with a filing date of Sep. 20, 2016, designating the United States, now, and further claims priority to Chinese Patent Application No. 201510624460.6 with a filing date of Sep. 25, 2015. The content of the aforementioned applications, including any intervening amendments thereto, are incorporated herein by reference.

TECHNICAL FIELD

The present invention relates to a preparation method of para-aramid nanofibers, and belongs to the technical field of novel polymer materials.

BACKGROUND OF THE PRESENT INVENTION

Poly-para-phenylene terephthalamide (PPTA) is a liquid crystal polymer, contains rigid benzene rings and strongly polar amido bonds in molecular chains, achieves a strong hydrogen-bond interaction among the molecular chains and is simple and symmetrical in structure and regular in arrangement. A fiber prepared from the PPTA is a high-performance material, has excellent performances such as high strength, high modulus, high temperature resistance, corrosion resistance and the like, and is widely applied to the fields of special garments, aerospace, sporting goods, cables, composite materials and the like.

A para-aramid nanofiber has a nano-scale fiber diameter, has a large specific surface area, is also easy to process and convenient to be compounded with other materials, has excellent heat-insulating property and oxidation resistance, and has wide application prospects in the fields of supercapacitors, battery separator materials, high-precision filter materials and the like. However, preparation of the para-aramid nanofiber faces severe challenges in technology. At present, three publicly reported methods for preparing the para-aramid nanofiber include: an electrostatic spinning method, a chemical dissociation method and a physical splitting method. Srinivasan et al. [Polymer International, 1995, 36(2):195] improve the traditional electrostatic spinning equipment and modify electrodes into a coagulating tank. During spinning, PPTA sulfuric acid liquor is sprayed into a coagulating bath with static electricity at high pressure and is cured to obtain fibers with a nano or submicron diameter. The method is complicated in production process, low in production efficiency and difficult to realize large-scale application. A patent US2013288050-A1 reports that, aramid fibers are dissociated into nano-scale fibers in a dimethyl sulfoxide (DMSO) solution by adding a strong base potassium hydroxide (KOH). Similar alkali dissolution methods are adopted in CN104562650A, CN104480702A, CN103146007A, CN103937237A, CN103537198A and CN103824988, thereby preparing the nano-scale para-aramid fibers. However, the preparation method is long in reaction time, low in effective concentration and low in production efficiency, and the obtained ionized structure is instable. Moreover, an original property of aramid is often damaged in a chemical reaction. Ifuku et al. (RSC Adv, 2014, 4: 40377) pretreat aramid fibers through basic dissociation and then physically split the aramid fibers into nanofibers at high pressure. Because high-pressure equipment is used, the method is high in production difficulty.

SUMMARY OF PRESENT INVENTION

A purpose of the present invention is to propose a novel preparation met hod of para-aramid nanofibers, i.e., in a polymerization process of terephthaloyl chloride and p-phenylenediamine, a molecular aggregation scale of a polymer PPTA is controlled by adding surfactants with strong hydrogen-bond interactions with the PPTA, and growth of a PPTA molecular chain is not influenced. After polymerization is completed, a PPTA aggregate is stably dispersed by virtue of a combined action of a coagulator and high-speed shearing, thereby forming the para-aramid nanofibers. Finally, the surfactants are removed by virtue of washing and purification, thereby obtaining high-purity para-aramid nanofibers. The method is short in production process and simple in equipment and can realize stable batch production, thereby meeting needs of large-scale production of the para-aramid nanofibers.

The preparation method of para-aramid nanofibers proposed in the present invention includes the following steps:

(1) Modified Polymerization:

under nitrogen protection, adding a dewatered solvent N-methyl pyrrolidone (NMP) with moisture content lower than 150 ppm into a reaction container; adding solubilizing salt and surfactants while stirring, wherein the solubilizing salt is calcium chloride or lithium chloride; and heating to 80-100° C. to dissolve the solubilizing salt and the surfactants to obtain a solution of the solubilizing salt and the surfactants, wherein a concentration of the solubilizing salt is 5-10 wt % and a concentration of the surfactants is 0-3 wt %. An addition amount of the surfactants is related to a concentration of the polymer PPTA. The lower the concentration of the PPTA is, or the lower the concentration of the monomers of p-phenylenediamine and terephthaloyl chloride is, the less the use amount of the surfactants is. Only in case of an extremely low concentration, the para-aramid nanofibers can be prepared by virtue of subsequent dispersion and high-speed shearing actions without using the surfactants. Certainly, the use amounts of different types of the surfactants are different among different molecular weights:

cooling the solution to 0-15° C., and adding the p-phenylenediamine into the reaction container, wherein the concentration of the p-phenylenediamine is 0.1-0.6 mol/L; continuously cooling the solution to −5-5° C. after the p-phenylenediamine is dissolved, and adding terephthaloyl chloride, wherein a molar ratio of the terephthaloyl chloride to the p-phenylenediamine is (1.000-1.010):1; accelerating the stirring speed and continuously reacting for 5-30 minutes, and controlling a reaction temperature to be below 70° C.; and stopping stirring when a gel phenomenon occurs in the reaction system before reactants are completely agglomerated, thereby obtaining frozen gel, dispersing into fibers:

adding a dispersing agent of N-methyl pyrrolidone into the frozen gel in the above step (1) while high-speed stirring to disperse the frozen gel into a uniform gel solution, wherein a stirring speed and stirring time are regulated according to a dispersion effect and an addition amount of the dispersing agent of N-methyl pyrrolidone is 2-10 times of the solvent used in the above step (1);

adding a coagulator into the above gel solution while high-speed stirring, or injecting the above gel solution into a coagulator under high-speed stirring, thereby obtaining a suspension containing the para-aramid nanofibers, wherein the stirring speed and the stirring time are regulated according to a forming effect of the nanofibers, and the use amount of the coagulator is 2-10 times of mass of the dispersing agent; and (3) Washing and Purification:

purifying the suspension in a manner of continuous countercurrent washing or a manner of centrifugal washing to remove the solvent, the surfactants, the solubilizing salt and other impurities, and finally dispersing with water, thereby obtaining the pure aqueous dispersion of the para-aramid nanofibers.

The above surfactants are polyoxyethylene ether nonionic surfactants, wherein the molecular weight of the polyoxyethylene ether nonionic surfactants is from 500 to 30000, and terminal groups at one end or both ends of surfactant molecules are methoxy group, hydroxyl, amino, carboxyl or siloxy. The above coagulator is one or a mixture of water, methanol or ethanol and other liquid alcohols according to any ratio.

The finally obtained para-aramid nanofibers are characterized by a transmission electron microscope (TEM) or a scanning electron microscope (SEM). Diameters of the fibers are within a range of 10 to 100, and lengths of the fibers reach hundreds of microns. The diameters and the lengths of the nanofibers are different according to formulas and processes, and are particularly obviously influenced by the concentrations of the polymer and the surfactants. The purified nanofibers are dewatered and dried (120° C., 10 h), and a logarithmic viscosity number ($\eta$inh) is determined by using a Ubbelohde viscometer. According to the differences of the formulas and the processes, $\eta$inh is within a range of 3.0-6.0, which means that the method in the patent not only can prepare the nanofibers, but also can maintain a high molecular weight of the polymer.

The preparation method of the para-aramid nanofibers proposed in the present invention has the advantages that: the preparation method in the present invention starts from polymerization, and the surfactants are added for direct dispersion to obtain the para-aramid nanofibers. The process flow is simple; an after-treatment process is decreased; and a possibility is provided for taking the para-aramid nanofibers as a raw material for preparing aramid paper or an additive material of a high-performance composite material.

DESCRIPTION OF THE DRAWINGS

FIG. 1 is a transmission electron microscope image of para-aramid nanofibers obtained in a preparation method in embodiment 1 of the present invention.

DETAILED DESCRIPTION OF PREFERRED EMBODIMENTS

Embodiments of a method in the present invention are introduced below.

Embodiment 1 steps: under nitrogen protection, adding 100 mL of a dewatered solvent N-methyl pyrrolidone with moisture content of about 100 ppm into a reaction container; adding 7.5 g of solubilizing salt of CaCl2 and 2 g of surfactant of dimethoxy polyethylene glycol (with a molecular weight of 2000) while stirring; heating to 100° C. to dissolve the solubilizing salt and the surfactant to obtain a solution of the solubilizing salt and the surfactant; cooling the solution to 15° C. in a cold bath, adding 4.326 g of p-phenylenediamine into the reaction container, and cooling the reaction container to 0° C. after the p-phenylenediamine is dissolved; and adding 8.189 g of terephthaloyl chloride, gradually accelerating the stirring speed as 2000 r/m, reacting for 5 min at a reaction temperature below 70° C., continuing to react for 2 min after a gel phenomenon occurs in the reaction system, and stopping stirring, thereby obtaining frozen gel;

transferring the frozen gel into a tissue dispersion machine, adding 500 mL of dispersing agent of N-methyl pyrrolidone into the frozen gel while high-speed stirring to disperse the frozen gel into a uniform gel solution, wherein the stirring speed is 2000 r/min, and the stirring time is 5 min; and injecting the gel solution into 1000 mL of water under high-speed stirring with the stirring speed of 2000 r/min and the stirring time of 10 min, thereby obtaining uniform and stable suspension containing the para-aramid nanofibers; and washing the suspension with water on a countercurrent belt filter, and finally dispersing with water, thereby obtaining aqueous dispersion of the para-aramid nanofibers.

A transmission electron microscope image of the para-aramid nanofibers prepared in the present embodiment is shown in FIG. 1. Diameters of the fibers are about tens of nanometers, and lengths of the fibers are predicted to exceed microns. It should be indicated that, distribution of the diameters of the fibers is difficult to be counted since many fibers are wound together. However, seen from most of results, the diameters of the obtained nanofibers are within 100 nm, and the lengths are also large.

Embodiment 2 steps: under nitrogen protection, adding 100 mL of dewatered solvent of N-methyl pyrrolidone with moisture content of about 120 ppm into a reaction container; adding 6 g of solubilizing salt of LiCl and 1.5 g of surfactant of olyethylene glycol monomethyl ether (with a molecular weight of 2000) while stirring; heating to 80° C. to dissolve the solubilizing salt and the surfactant to obtain a solution of the solubilizing salt and the surfactant; cooling the solution to 10° C. in a cold bath, adding 2.163 g of p-phenylenediamine (PPD) into the reaction container, and cooling the reaction container to −5° C. after the p-phenylenediamine is dissolved; and adding 4.095 g of terephthaloyl chloride (TPC), gradually accelerating the stirring speed as 1500 r/min, stopping stirring after reacting for 30 min to obtain frozen gel, and controlling a reaction temperature to be below 70° C.;

transferring the frozen gel into a tissue dispersion machine, adding 300 mL of dispersing agent of N-methyl pyrrolidone into the frozen gel while high-speed stirring to disperse the frozen gel into a uniform gel solution, wherein the stirring speed is 1000 r/min, and the stirring time is 5 min; and adding the gel solution into 2000 mL of methanol while strongly stirring with the stirring speed of 1500 r/min and the stirring time of 10 min, thereby obtaining uniform and stable suspension containing the para-aramid nanofibers; and repeatedly washing the uniform and stable suspension containing the para-aramid nanofibers with water for 5 times by using a centrifugal machine, and finally dispersing with water, thereby obtaining the dispersion of the para-aramid nanofibers.

Embodiment 3 steps: under nitrogen protection, adding 100 mL of dewatered solvent of N-methyl pyrrolidone with moisture content of about 120 ppm into a reaction container; adding 8 g of solubilizing salt CaCl2 and 2.5 g of a surfactant amino-terminated polyethylene glycol (with a molecular weight of 2000) while stirring; heating to 90° C. to dissolve the solubilizing salt and the surfactant to obtain a solution of the solubilizing salt and the surfactant; cooling the solution to 10° C. in a cold bath, adding 6.489 g of p-phenylenediamine (PPD) into the reaction container, and cooling the reaction container to −2° C. after the p-phenylenediamine is dissolved; and adding 12.284 g of terephthaloyl chloride (TPC), gradually accelerating the stirring speed to be 1500 r/min, continuously reacting for 4 minutes, controlling a reaction temperature to be below 70° C., and immediately stopping stirring after a gel phenomenon occurs in the reaction system, thereby obtaining frozen gel;

transferring the frozen gel into a tissue dispersion machine, adding 800 mL of dispersing agent of N-methyl pyrrolidone into the frozen gel while high-speed stirring to disperse the frozen gel into a uniform gel solution, wherein the stirring speed is 2000 r/min, and the stirring time is 5 min; and injecting the gel solution into 5000 mL of coagulator ethanol under high-speed stirring with the stirring speed of 3000 r/min and the stirring time of 10 min, thereby obtaining uniform and stable suspension containing the para-aramid nanofibers; and repeatedly washing the uniform and stable suspension containing the para-aramid nanofibers with water for 5 times by using a centrifugal machine, and finally dispersing with water, thereby obtaining the dispersion of the para-aramid nanofibers.

Embodiment 4 steps: under nitrogen protection, adding 100 mL of dewatered solvent of N-methyl pyrrolidone with moisture content of about 60 ppm into a reaction container; adding 6 g of solubilizing salt LiCl and 1 g of surfactant of di-ester-terminated polyethylene glycol (with a molecular weight of 2000) while stirring; heating to 90° C. to dissolve the solubilizing salt and the surfactant to obtain a solution of the solubilizing salt and the surfactant; cooling the solution to 15° C. in a cold bath, adding 2.163 g of p-phenylenediamine (PPD) into the reaction container, and cooling the reaction container to −5° C. after the p-phenylenediamine is dissolved; and adding 4.095 g of terephthaloyl chloride (TPC), gradually accelerating the stirring speed to be 1500 r/min, continuously reacting for 8 minutes, controlling a reaction temperature to be below 70° C., and continuing to react for 10 min and stopping stirring after a gel phenomenon occurs in the reaction system, thereby obtaining frozen gel;

transferring the frozen gel into a tissue dispersion machine, adding 400 mL of dispersing agent of N-methyl pyrrolidone into the frozen gel while high-speed stirring to disperse the frozen gel into a uniform gel solution, wherein the stirring speed is 1500 r/min and the stirring time is 5 min; and adding the gel solution into 2000 mL of water while strongly stirring with the stirring speed of 3000 r/min and the stirring time of 10 min, thereby obtaining uniform and stable suspension containing the para-aramid nanofibers; and washing the uniform and stable suspension containing the para-aramid nanofibers with water on a countercurrent belt filter, and dispersing with water again, thereby obtaining the dispersion of the para-aramid nanofibers.

Embodiment 5 steps: under nitrogen protection, adding 100 mL of dewatered solvent of N-methyl pyrrolidone into a reaction container; adding 8 g of solubilizing salt of CaCl while stirring; heating to 100° C. to dissolve the solubilizing salt to obtain a solution of the solubilizing salt; cooling the solution to 15° C. in a cold bath, adding 2.163 g of p-phenylenediamine (PPD) into the reaction container, and cooling the reaction container to 0° C. after the p-phenylenediamine is dissolved; and adding 4.095 g of terephthaloyl chloride (TPC), gradually accelerating the stirring speed to be 1500 r/min, continuously reacting for 8 minutes, controlling a reaction temperature to be below 70° C., and continuing to react for 10 minutes and stopping stirring after a gel phenomenon occurs in the reaction system, thereby obtaining frozen gel;

transferring the frozen gel into a tissue dispersion machine, adding 1000 mL of dispersing agent of N-methyl pyrrolidone into the frozen gel while high-speed stirring to disperse the frozen gel into a uniform gel solution, wherein the stirring speed is 2500 r/min and the stirring time is 5 min; and adding the gel solution into 8000 of water while strongly stirring with the stirring speed of 4000 r/min and the stirring time of 10 min, thereby obtaining uniform and stable suspension containing the para-aramid nanofibers; and washing the uniform and stable suspension containing the para-aramid nanofibers with water on a countercurrent belt filter, and dispersing with water again, thereby obtaining the dispersion of the para-aramid nanofibers.

I claim:

1. A preparation method of para-aramid nanofibers, comprising:

(1) modified polymerization:

under nitrogen protection, adding a dewatered solvent N-methyl pyrrolidone (NMP) with moisture content lower than 150 ppm into a reaction container; adding an solubilizing salt under stirring without the use of surfactants, wherein the solubilizing salt is calcium chloride or lithium chloride; and heating to 80-100° C. to dissolve the solubilizing salt to obtain a solution of the solubilizing salt, wherein a concentration of the solubilizing salt is 5-10 wt % and a concentration of the surfactants is 0 wt %;

then cooling the solution to 0-15° C., and adding p-phenylenediamine into the reaction container for stirring and dissolving, and controlling the concentration of the p-phenylenediamine as 0.1-0.6 mol/l; continuously cooling the solution to 5-5° C., and adding terephthaloyl chloride, wherein a molar ratio of the terephthaloyl chloride to the p-phenylenediamine is (1.000-1.010):1; accelerating the stirring speed and continuously reacting for 5-30 minutes, and controlling a reaction temperature to be below 70° C.; and stopping stirring when a gel phenomenon occurs in the reaction system before reactants are completely agglomerated, thereby obtaining frozen gel;

(2) dispersing into fibers:

adding a dispersing agent of N-methyl pyrrolidone into the frozen gel in the above step (1) while high-speed stirring to disperse the frozen gel into a uniform gel solution, wherein a stirring speed and stirring time are regulated according to a dispersion effect and an addition amount of the dispersing agent of N-methyl pyrrolidone is 2-10 times of the solvent used in the above step (1);

adding a coagulator into the above gel solution while high-speed stirring, or injecting the above gel solution into a coagulator under high-speed stirring, thereby obtaining a suspension containing the para-aramid nanofibers, wherein the stirring speed and the stirring time are regulated according to a forming effect of the nanofibers, and the use amount of the coagulator is 2-10 times of mass of the dispersing agent; and (3) washing and purification:

purifying the suspension in a manner of continuous countercurrent washing or a manner of centrifugal washing to remove the solvent, the solubilizing salt and other impurities, and finally dispersing with water, thereby obtaining the pure aqueous dispersion of the para-aramid nanofibers;

wherein the obtained para-aramid nanofibers have diameters, within a range of 10 to 100, adjustable according to change of formulas and processes, and have lengths of hundreds of microns; and a polymer has a logarithmic viscosity number ($\theta_{inh}$) within a range of 3.0-6.0.

2. The preparation method of para-aramid nanofibers according to claim 1, wherein the coagulator is one or a mixture of water, methanol or ethanol and other liquid alcohols according to any ratio.

\* \* \* \* \*